United States Patent
Kim

(10) Patent No.: US 7,929,084 B2
(45) Date of Patent: Apr. 19, 2011

(54) TRANSFLECTIVE LIQUID CRYSTAL DISPLAY DEVICE AND MANUFACTURING METHOD THEREOF

(75) Inventor: Dong Yung Kim, Gyeonggi-do (KR)

(73) Assignee: LG Display Co., Ltd., Seoul (KR)

(*) Notice: Subject to any disclaimer, the term of this patent is extended or adjusted under 35 U.S.C. 154(b) by 0 days.

(21) Appl. No.: 12/582,337

(22) Filed: Oct. 20, 2009

(65) Prior Publication Data
US 2010/0039593 A1   Feb. 18, 2010

Related U.S. Application Data

(62) Division of application No. 11/387,712, filed on Mar. 24, 2006, now Pat. No. 7,623,205.

(30) Foreign Application Priority Data

Dec. 29, 2005 (KR) ................................ 1329102005
Mar. 7, 2006 (KR) ................................ 0211832006

(51) Int. Cl.
G02F 1/1335 (2006.01)
H01L 21/00 (2006.01)

(52) U.S. Cl. ........ 349/114; 349/104; 349/105; 349/106; 349/107; 349/108; 349/109; 349/110; 349/113; 349/122; 349/123; 349/187; 438/30

(58) Field of Classification Search .......... 349/113–114, 349/122–123, 129, 139, 104–110, 187; 438/30
See application file for complete search history.

(56) References Cited

U.S. PATENT DOCUMENTS

| 6,535,259 | B2* | 3/2003 | Lee et al. | 349/123 |
| 7,102,716 | B2* | 9/2006 | Lee et al. | 349/114 |
| 2004/0201803 | A1* | 10/2004 | Yang et al. | 349/114 |
| 2005/0030454 | A1* | 2/2005 | Jang et al. | 349/114 |
| 2005/0168671 | A1 | 8/2005 | Lee et al. | |

* cited by examiner

*Primary Examiner* — Brian M. Healy
*Assistant Examiner* — Guy G Anderson
(74) *Attorney, Agent, or Firm* — Morgan, Lewis & Bockius LLP

(57) ABSTRACT

A transflective liquid crystal display device includes first and second substrates facing each other, a gate line and a data line on the first substrate, the gate and data lines intersecting each other and defining a pixel region having a transmissive region and a reflective region, a thin film transistor at an intersection between the gate line and the data line, a pixel electrode in the pixel region connected to the thin film transistor, an organic insulating layer on the second substrate, the organic insulating layer including a through-hole in the transmissive region, a reflective electrode on the organic insulating layer in the reflective region, a black matrix on the second substrate, a color filter layer on the second substrate in the pixel region, and a liquid crystal layer between the first and second substrates.

8 Claims, 7 Drawing Sheets

TRANSFLECTIVE LIQUID CRYSTAL DISPLAY DEVICE AND MANUFACTURING METHOD THEREOF

This application is a divisional of U.S. patent application Ser. No. 11/387,712 filed on Mar. 24, 2006. The present invention claims the benefit of Korean Patent Application No. 132910/2005 filed in Korea on Dec. 29, 2005 and Korean Patent Application No. 021183/2006 filed in Korea on Mar. 7, 2006, which are both hereby incorporated by reference.

BACKGROUND OF THE INVENTION

1. Field of the Invention

The present invention relates to a display device, and more particularly, to a transflective liquid crystal display device and a manufacturing method thereof that selectively operate in a reflective mode or a transmissive mode.

2. Discussion of the Related Art

Liquid crystal display ("LCD") devices can be classified into a transmissive type using a backlight as a light source and a reflective type using natural or artificial light without using the backlight. A transmissive LCD device displays a bright image even in dark environments by using a backlight as a light source. However, the transmissive LCD device consumes a large amount of power. On the other hand, the reflective LCD device does not use a backlight and thus consumes a low amount of power. However, the reflective LCD device cannot be used when an external environment is dark.

A transflective LCD device has been developed to address these problems. A transflective LCD device includes both a reflective region and a transmissive region in a unit pixel region, and thus has both functions of the transmissive LCD device and the reflective LCD device. Also, because the transflective LCD device uses both light from a backlight and natural or artificial light from the outside, it is not restricted by peripheral environments and consumes a small amount of power.

FIG. 1 is an exploded perspective view of a transflective type LCD device according to the related art, and FIG. 2 is a cross-sectional view of the transflective type LCD device shown in FIG. 1. In FIG. 1, a transflective LCD device 11 includes an upper substrate 15, a lower substrate 21 and a liquid crystal layer 14 therebetween. The upper substrate 15 includes a common electrode 13 formed on a black matrix 16 and a sub-color filter 17.

The lower substrate 21, which is often referred to as an array substrate, includes a plurality of gate lines 25 and data lines 39. A pixel region P is defined by the intersections between the gate and data lines 25 and 39 and includes a transmissive region B and a reflective region D. A switching element T is formed at each pixel region P. The pixel region P also includes a reflective electrode 49 and a transparent pixel electrode 61.

As shown in FIG. 2, the reflective electrode 49 having a transmission hole A is formed on the lower substrate 21 over the transparent pixel electrode 61. A backlight 91 is disposed under the lower substrate 21.

When the transflective LCD device 11 operates in a reflective mode, it uses natural or artificial light from the outside as a light source. Light F2 incident on the upper substrate 15 is reflected by the reflective electrode 49. The reflected light penetrates the liquid crystal layer 14 arranged by an electric field generated between the reflective electrode 49 and the common electrode 13. In particular, the amount of light penetrating the liquid crystal layer 14 is adjusted by the arrangement of liquid crystal molecules in the liquid crystal layer 14, thereby displaying an image.

In a transmissive mode, the transflective LCD device 11 uses light F1 from the backlight 91 as a light source. Light emitted from the backlight 91 passes through the transparent pixel electrode 61 and penetrates the liquid crystal 14 arranged by an electric field generated between the common electrode 13 and the transparent pixel electrode 61. In particular, the amount of light penetrating the liquid crystal layer 14 is adjusted by the arrangement of liquid crystal molecules in the liquid crystal layer 14, thereby displaying an image.

FIG. 3 is a detailed plan view of a portion of an array substrate of a transflective LCD device according to the related art. In FIG. 3, a gate pad electrode 27 is formed at one end of the gate line 25. The gate pad electrode 27 is formed wider than the gate line 25. A data pad electrode 41 is formed at one end of the data line 39. The data pad electrode 41 is formed wider than the data line 39. The gate pad electrode 27 and the data pad electrode 41 contact a transparent gate pad terminal electrode 63 and a transparent data pad terminal electrode 65, respectively, which directly receive external signals.

A pixel region P is defined by the gate and data lines 25 and 39 intersecting each other. The pixel region P includes a transparent pixel electrode 61 and a reflective electrode 49 with a transmission hole A, and thus is divided into a transmissive region B and a reflective region D.

The pixel region P also includes a thin film transistor T having a gate electrode 23, a source electrode 35, a drain electrode 37, and an active layer 31 on the gate electrode 23. A storage capacitor C is disposed on a portion of the gate line 25, and is connected in parallel to a transparent pixel electrode in the pixel region P.

The storage capacitor C includes a first capacitor electrode formed by a portion of the gate line 25 and a second capacitor electrode formed by a source-drain metal layer 43 disposed on the portion of the gate line 25. The source-drain metal layer 43 is formed on the same layer and of the same material as the drain electrode 37. The second capacitor electrode 43 may be connected through a contact hole 55 to the pixel electrode 61. Alternatively, the second capacitor electrode 43 may be extended to the drain electrode 37 through a lower portion of the reflective electrode 49 and over the gate line 25, such that the contact hole 55 is omitted.

FIG. 4 is a cross-sectional view taken along II-II', III-III' and IV-IV' of FIG. 3. As shown in FIG. 4, a gate electrode 23 and a gate line 25 are formed on a substrate 21, and a gate pad electrode 27 is formed at one end of the gate line 25. A gate insulating layer 29 is formed on an entire surface of the substrate 21 covering the gate electrode 23, the gate line 25 and the gate pad 27.

An active layer 31 and an ohmic contact layer 33 are formed on the gate insulating layer 29 above the gate electrode 23. Next, source and drain electrodes 35 and 37 contacting the ohmic contact layer 33, a data line 39 connected to the source electrode 35, and a data pad 41 disposed at one end of the data line 39 are formed on the gate insulating layer 29. Also, a source-drain metal layer 43 is formed on a portion of the gate line 25 in the pixel region P.

An insulating material is deposited on the resulting structure of the substrate 21 to form a passivation layer 45. The passivation layer 45 is an inorganic insulating layer formed by depositing silicon nitride ($SiN_x$) or silicon oxide ($SiO_2$).

A transparent organic insulating material is deposited on the passivation layer 45 to form an organic insulating layer 47.

The transparent organic insulating material is one of benzocyclobutene (BCB) and acryl-based resin. An uneven pattern 47b is formed on the reflective region D on the organic insulating layer 47.

The gate insulating layer 29, the passivation layer 45 and the organic insulating layer 47 are etched to form a through-hole 48. The through-hole 48 corresponds to a transmission hole of a reflective electrode that will be formed in a subsequent process.

The passivation layer 45 and the organic insulating layer 47 are etched to form a drain contact hole 53 exposing a portion of the drain electrode 37, a storage contact hole 55 exposing a portion of the source-drain metal layer 43, a gate pad contact hole 57 exposing a portion of the gate pad electrode 27, and a data pad contact hole 59 exposing a portion of the data pad electrode 41.

A transparent conductive metal is deposited on the entire surface of the resulting structure of the substrate 21 and the deposited metal is patterned to form a transparent pixel electrode 61 in the pixel region P contacting the drain electrode 37 and the source-drain metal layer 43, a gate pad terminal electrode 63 contacting the gate pad electrode 27, and a data pad terminal electrode 65 contacting the data pad electrode 41. The transparent conductive metal is one of indium-tin-oxide (ITO) and indium-zinc-oxide (IZO). In particular, the pixel electrode 61 is formed in the reflective region D in an uneven structure in accordance with the uneven pattern 47b of the organic insulating layer 47.

A metal, such as aluminum (Al) or Al alloy, is deposited on the entire surface of the substrate 21 where the through-hole 48 has been formed. The deposited metal is patterned to form a reflective electrode 49 having a transmission hole A corresponding to the through-hole 48. The reflective electrode 49 is in an uneven structure in accordance with the uneven structure of the pixel electrode 61 and the organic insulating layer 47.

However, the above related art method requires the depositing and patterning processes for forming the above uneven pattern and structure on an array substrate, thereby reducing manufacturing yield. For example, an array substrate can be rejected and wasted due to a defect in one of the patterning process, e.g., a defect in manufacturing the switching element thereon or a defect in manufacturing the reflective electrode thereon. Especially, since the complexity and cost for manufacturing the switching elements is higher, a defect in a later process of manufacturing the reflective electrode can spoil previous efforts in manufacturing the switching elements.

Also, an adhesion problem may occur between the organic insulating layer and one of the passivation layer and the pixel electrode due to the uneven structure, thereby reducing product quality.

SUMMARY OF THE INVENTION

Accordingly, the present invention is directed to a transflective liquid crystal display device and a manufacturing method thereof that substantially obviate one or more problems due to limitations and disadvantages of the related art.

An object of the present invention is to provide a dual cell gap transflective LCD and a manufacturing method thereof, wherein a reflective electrode, a through-hole for a dual cell gap, and the uneven structure are formed on a color filter substrate, thereby simplifying the manufacturing process of the array substrate. Also, the manufacturing process of the array substrate for the transflective LCD can be simplified using a general array substrate of a transmissive LCD.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a liquid crystal display device includes first and second substrates facing each other, a gate line and a data line on the first substrate, the gate and data lines intersecting each other and defining a pixel region having a transmissive region and a reflective region, a thin film transistor at an intersection between the gate line and the data line, a pixel electrode in the pixel region connected to the thin film transistor, an organic insulating layer on the second substrate, the organic insulating layer including a through-hole in the transmissive region, a reflective electrode on the organic insulating layer in the reflective region, a black matrix on the second substrate, a color filter layer on the second substrate in the pixel region, and a liquid crystal layer between the first and second substrates.

In another aspect of an embodiment of the present invention, a liquid crystal display device includes a first substrate having at least one switching element and a pixel electrode, a second substrate having a reflector, a liquid crystal layer between the first and second substrates, and a light source, light generated by the light source incident onto a bottom surface of the second substrate.

In yet another aspect of an embodiment of the present invention, a method of manufacturing a liquid crystal display device includes forming a gate electrode and a gate line on a first substrate, the gate line being electrically connected to the gate electrode, forming a first insulating layer on the first substrate, forming an active layer and an ohmic contact layer above the gate electrode, source and drain electrodes contacting the ohmic contact layer, and a data line electrically connected to the source electrode, the data line intersecting the gate line to define a pixel region, forming a pixel electrode contacting the drain electrode in the pixel region, depositing an organic insulating layer on a second substrate, patterning the organic insulating layer to form a through-hole and a groove, forming a reflective electrode on the organic insulating layer over the groove, forming a color filter layer in the through-hole and over the groove, and forming a liquid crystal layer between the first substrate and the second substrate.

In a further aspect of an embodiment of the present invention, a method of manufacturing a liquid crystal display device includes forming at least one switching element and a pixel electrode on a first substrate, forming a reflector on a first surface of a second substrate, forming a liquid crystal layer between the first and second substrates, and arranging a light source for light to be incident onto a second surface of the second substrate.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE PREFERRED EMBODIMENTS

Reference will now be made in detail to preferred embodiments of the present invention, examples of which are illustrated in the accompanying drawings.

Figure 1:
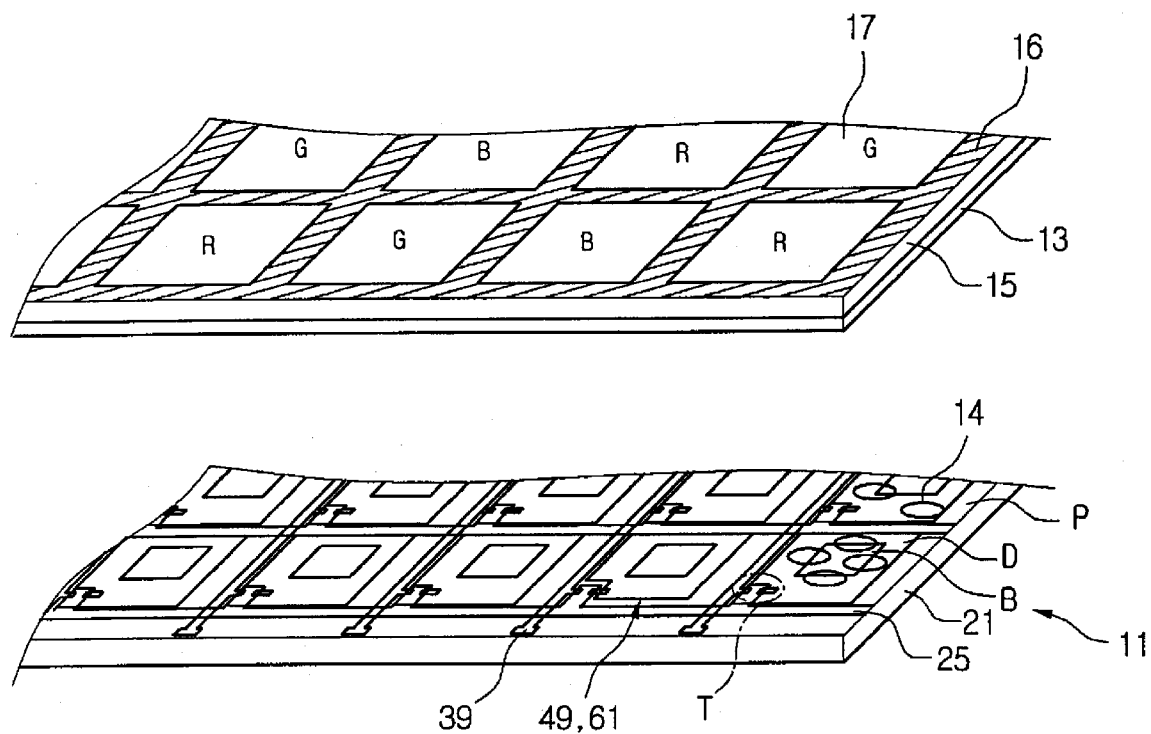
FIG. 1 is an exploded perspective view of a transflective type LCD device according to the related art.
Figure 2:
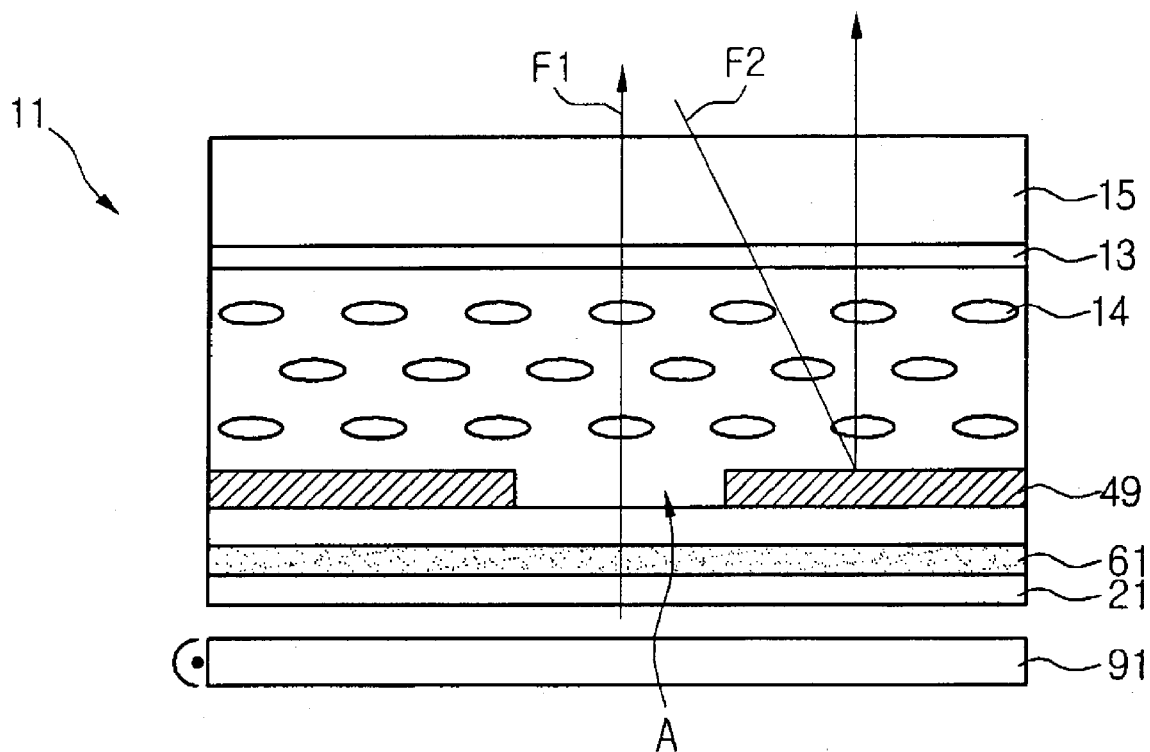
FIG. 2 is a cross-sectional view of the transflective type LCD device shown in FIG. 1.
Figure 3:
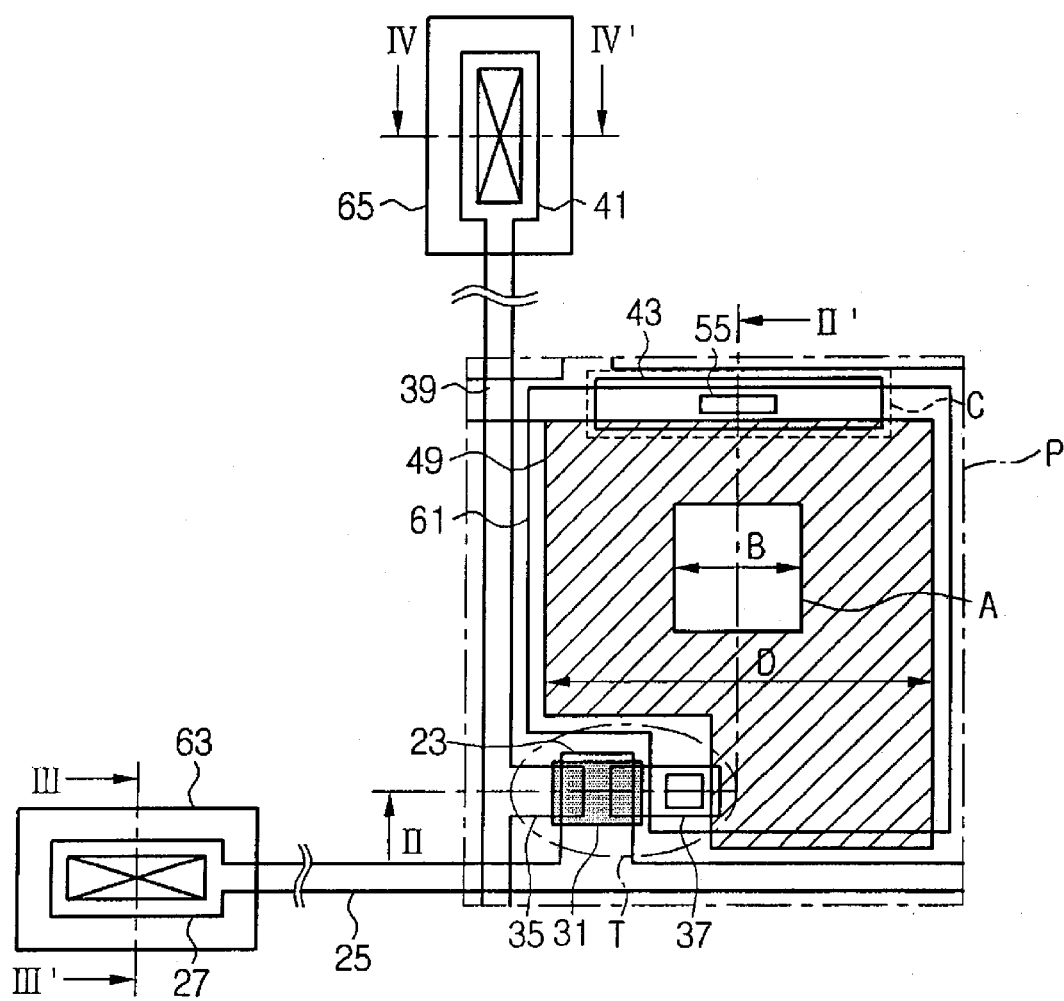
FIG. 3 is a detailed plan view of a portion of an array substrate of a transflective LCD device according to the related art.
Figure 4:
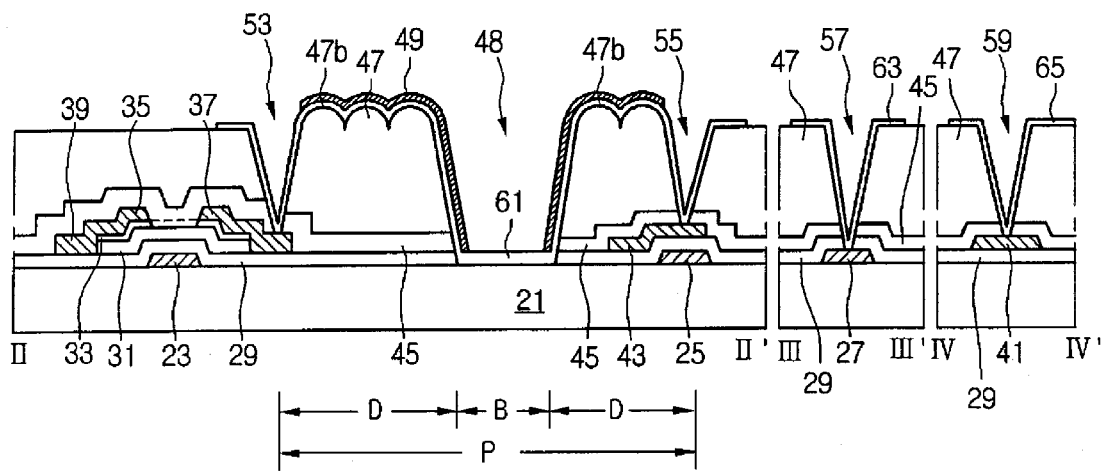
FIG. 4 is a cross-sectional view taken along II-II', III-III' and IV-IV' of FIG. 3.
Figure 5:
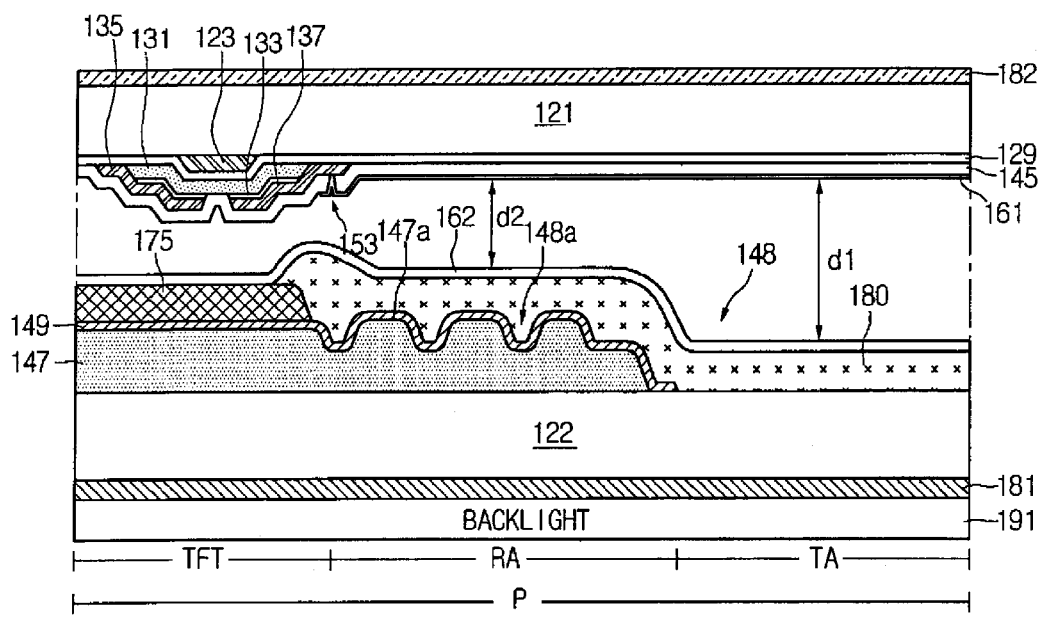
FIG. 5 is a cross-sectional view of a transflective type LCD device according to an embodiment of the present invention.

FIG. 5 is a cross-sectional view of a transflective type LCD device according to an embodiment of the present invention. In FIG. 5, an LCD device includes an array substrate 121, a color filter substrate 122 and a backlight 191. The array substrate 121 and the color filter substrate 122 are attached to one another with a space therebetween, and a first polarizer 181 and a second polarizer 182 are respectively on upper and lower outer surfaces of the bonded substrates 121 and 122. Light generated by the backlight 191 is incident through the first polarizer 181 onto the color filter substrate 122.

The array substrate 121 includes switching elements, e.g., thin film transistors ("TFTs"), arranged in a matrix type and at intersections between a plurality of gate lines and a plurality of data lines. Each of the switching elements TFT includes a gate electrode 123, a source electrode 135, a drain electrode 137, an active layer 131 and an ohmic contact layer 133. A gate insulating layer 129 is formed on the entire surface of the array substrate 121 over the gate lines and the gate electrode 123. In particular, the active layer 131 and an ohmic contact layer 133 are formed on the gate insulating layer 129 above the gate electrode 123. The source and drain electrodes 135 and 137 are spaced apart from each other by a distance and contact the ohmic contact layer 133. Although not shown, the source electrode 135 is connected to a data line.

In addition, the array substrate 121 has a pixel region P is defined by the gate and data lines intersecting each other. The pixel region P includes a transmissive region TA and a reflective region RA. Further, a passivation layer 145 is formed on the array substrate 121 over the switching elements, data lines and gate lines. The passivation layer 145 may include a silicon insulation material, such as one of silicon nitride (SiN.sub.x) and silicon oxide (SiO.sub.2).

A pixel electrode 161 also is formed on the passivation layer 145 in the pixel region P. The pixel electrode 161 includes a transparent conductive material, such as one of indium-tin-oxide (ITO), indium-zinc-oxide (IZO) and indium-tin-zinc-oxide (ITZO). The pixel electrode 161 is connected through a drain contact hole 153 to the drain electrode 137.

The color filter substrate 122 includes a reflective electrode 149 and an insulating layer 147. The insulating layer 147 has a through-hole 148 for a dual cell gap structure and an uneven pattern 147a for further enhancing the reflection efficiency. The insulating layer 147 may include an organic material or an inorganic material, e.g., one of benzocyclobutene (BCB), a spin-on-glass (SOG) material, and an acryl-based resin. The insulating layer 147 preferably includes a photosensitive organic material for reducing the number of masking steps and improving adhesion between layers.

The reflective electrode 149 is formed in the reflective region RA above the insulating layer 147 and may include a highly reflective metal, such as one of aluminum (Al) and an Al alloy.

A black matrix 175 is formed on the insulating layer 147 in a region corresponding to the switching element TFT on the array substrate 121 and in a region corresponding to the boundary of the pixel region P. A color filter 180 is further formed in the reflective region RA and the transmissive region TA.

Moreover, the transflective LCD device has a dual cell gap in the refractive and transmissive regions RA and TA due to the through-hole 148 of the insulating layer 147. For example, the first cell gap d1 in the transmissive region TA may be about two times as large as that the second cell gap d2 in the reflective region RA. In particular, the substrates 121 and 122 may have a step-wise or a varying cell gap in a transitional region between the reflective and transmissive regions RA and TA. As a result, light efficiency is improved in the reflective and transmissive regions RA and TA. Further, the LCD device may have one of twisted nematic (TN), optically compensated bend (OCB), electrically controlled birefigence (ECB), vertical alignment (VA), and fringe field switching (FFS) modes.

Accordingly, in the transflective LCD device according to an embodiment of the present invention, the reflective electrode is not formed on the array substrate. In particular, the array substrate is substantially the same as an array substrate of a transmissive LCD device, thereby simplifying the manufacturing process of the array substrate. Consequently, separate processes and production lines for manufacturing an array substrate of a transflective LCD device become unnecessary, to thereby reduce manufacturing cost and improve production efficiency.

Figure 6:
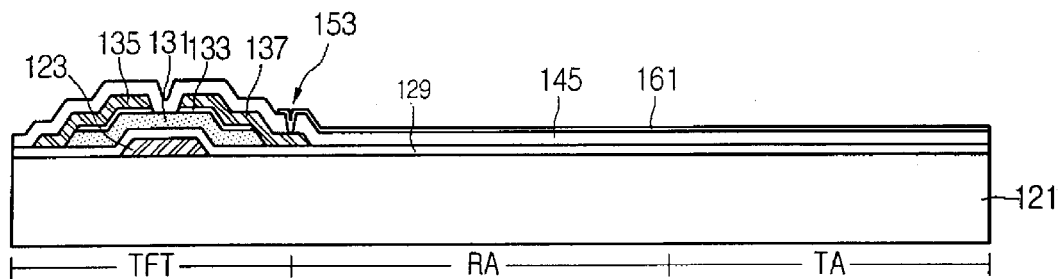
FIG. 6 is a cross-sectional view of an array substrate according to an embodiment of the present invention.

FIG. 6 is a cross-sectional view of an array substrate of a transflective type LCD device according to an embodiment of the present invention. In FIG. 6, an array substrate of a transflective type LCD device includes switching devices, e.g., TFTs, arranged in a matrix type and at intersections between a plurality of gate lines (not shown) and a plurality of data lines (not shown). A pixel region is defined by the gate and data lines intersecting each other. The pixel region includes a transmissive region TA and a reflective region RA.

A gate electrode 123 is formed to extend from the gate line to the pixel region. A gate insulating layer 129 is formed on the entire surface of the array substrate 121 over the gate electrode 123. The gate insulating layer 129 is formed by depositing an inorganic insulating material, e.g., one of silicon nitride (SiNx) and silicon oxide (SiO.sub.2).

In addition, an active layer 131 and an ohmic contact layer 133 are formed on the gate insulating layer 129 above the gate electrode 123. The active layer 131 may be formed of intrinsic amorphous silicon (a-Si:H), and the ohmic contact layer 133 may be formed of impurity (or dopant) containing amorphous silicon (n+a-Si:H). Alternatively, amorphous silicon may be crystallized using a laser to form a polysilicon active layer, thereby enhancing the electron mobility. Impurities or dopants are implanted into the polysilicon active layer to form source/drain impurity regions, thereby replacing the ohmic contact layer 133.

A conductive material is deposited on the entire surface of the substrate 121 where the ohmic contact layer 133 has been formed. The conductive metal may be one of chrome (Cr), molybdenum (Mo), titanium (Ti), tungsten (W), aluminum (Al), and Al alloy. The deposited metal is patterned to form source and drain electrodes 135 and 137 contacting the ohmic contact layer 133 and a data line intersecting a gate line and connected to the source electrode 135. Alternatively, the active layer 131, the ohmic contact layer 133 and the source/drain electrodes 135 and 137 may be simultaneously deposited and formed by a photolithography process using a diffractive mask or a half-tone mask.

A passivation layer 145 is formed on the entire surface of the array substrate 121. The passivation layer 145 may be a silicon insulation layer formed by depositing one of silicon nitride (SiNx) and silicon oxide (SiO.sub.2). Since the silicon insulation layer has desirable interface characteristics with respect to the active layer 131, no electron-trapping energy level exists in the interface. The mobility of electrons flowing through the active layer 131 can be enhanced. Further, a drain contact hole 153 is formed in the passivation layer 145 to expose a portion of the drain electrode 137.

A transparent conductive material is deposited on the passivation layer 145 and into the drain contact hole 153. The deposited material is patterned to form a transparent pixel electrode 161 of the pixel region connected to the drain electrode 137. The transparent conductive material may be one of indium-tin-oxide (ITO), indium-zinc-oxide (IZO) and indium-tin-zinc-oxide (ITZO).

The array substrate 121 of the transflective LCD device is substantially identical to an array substrate of a transmissive LCD device. Therefore, the array substrate 121 may be used for either a transflective LCD device or a transmissive LCD device, thereby increasing production yield.

Figure 7A:
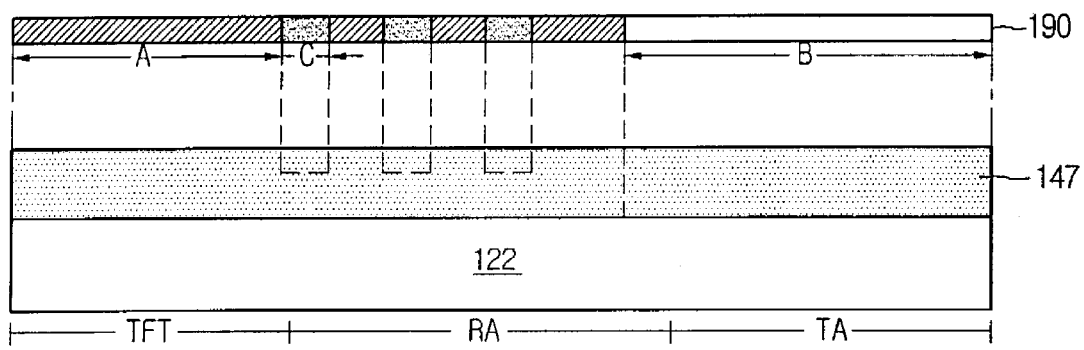
FIGS. 7A to 7D are cross-sectional views illustrating a manufacturing method of a color filter substrate of a transflective type LCD device according to an embodiment of the present invention.

FIGS. 7A to 7D are cross-sectional views illustrating a manufacturing method of a color filter substrate of a transflective type LCD device according to an embodiment of the present invention. As shown in FIG. 7A, a pixel region of a color filter substrate 122 may include a reflective region RA and a transmissive region TA. A transparent insulating material is deposited on a transparent substrate. The transparent insulating material may be photosensitive and may include one of benzocyclobutene (BCB), a spin-on-glass (SOG) material, and an acryl-based resin. For example, when a transparent photosensitive insulating material is employed, a half-tone mask or a diffractive mask 190 is disposed over the substrate and the deposited transparent photosensitive insulating material is exposed to light through the halftone/diffractive mask 190.

In the halftone exposure process, the amount of ultraviolet rays penetrating the half-tone mask 190 is adjusted using a light-absorbing mask whose absorbance varies depending on a position, thereby forming a pattern with a varying thickness. For example, the halftone mask 190 is divided into a blocking region A, a full transmission region B and a partial transmission region C. The partial transmission region C may be formed to have a different absorbance depending on specifications.

Figure 7B:
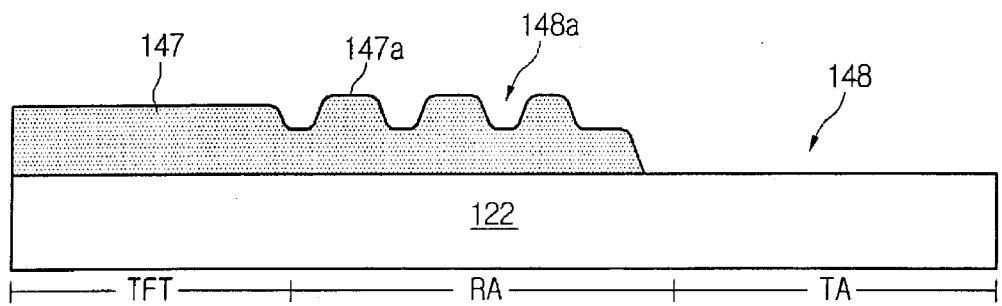

As shown in FIG. 7B, when the deposited transparent photosensitive insulating material is a positive type, i.e., a portion exposed to light in the exposure operation is removed, while a portion that is not exposed to the light remains, a region the light blocking region A of the half-tone mask 190 (shown in FIG. 7A) prevents the development of the photosensitive insulating layer 147. A region of the photosensitive insulating layer 147 is fully removed by light penetrating through the full transmission region B, thereby forming a through-hole 148 in the transmissive region TA. Thus, the substrate 122 is exposed by the through-hole 148 of the insulating layer 147 in the transmissive region TA.

Further, by the partial transmission region C of the half-tone mask 190, a groove portion 148a of an uneven pattern 147a is formed in the photosensitive insulating layer 147 in the reflective region RA. The uneven pattern 147a of the photosensitive insulating layer 147 is formed by the depth of the groove portion 148a of the photosensitive insulating layer 147 in the reflective region RA. The uneven pattern 147a may be an embossing pattern in random shapes, such as a circular shape and a triangular shape. When an uneven pattern 147a with an angled edge is melted and hardened, an uneven pattern 147a with a rounded edge is formed in the reflective region RA.

When the deposited transparent photo organic insulating material is a negative type, regions developed by the half-tone mask 190 may be opposite. Due to the through-hole 148, the first cell gap d1 in the transmissive region TA may be about two times as large as the second cell gap d2 in the reflective region RA. This difference in cell gaps enhances light efficiency in the reflective and transmissive regions RA and TA.

Figure 7C:
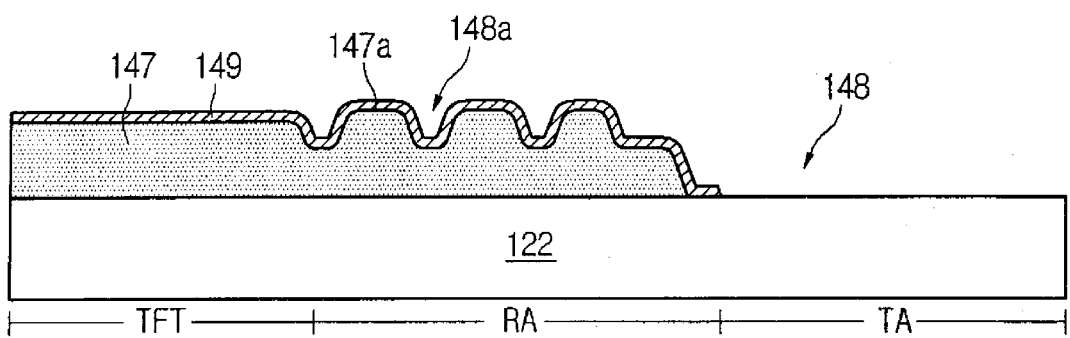

As shown in FIG. 7c, a highly-reflective metal, such as Al or Al alloy, e.g., AlNd, is deposited on the entire surface of the substrate 122 over the insulating layer 147, and the deposited metal is patterned to form a reflective electrode 149 in the reflective region RA. In particular, the reflective electrode 149 has an embossing structure due to the uneven pattern 147a in the insulating layer 147, and thus its reflectance is further enhanced.

Figure 7D:
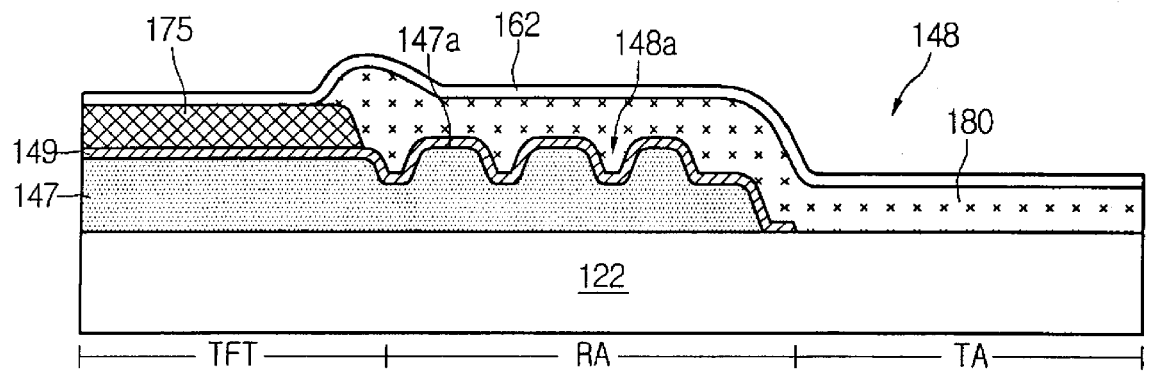

As shown in FIG. 7D, a black matrix 175 for preventing light leakage is formed at a region corresponding to a TFT formed on a opposing array substrate and the peripheral boundary of the pixel region. The black matrix 175 may be formed in a single metal layer, such as chrome (Cr), or a multi-layer of chrome/chrome oxide (Cr/CrO.sub.x). Alternatively, the black matrix 175 may be formed of a black resin. In addition, a color filter 180 is formed in the pixel region partitioned by the black matrix 175. Although not illustrated, the color filter 180 includes red, green and blue color filters sequentially patterned in a plurality of pixel regions.

Further, a transparent conductive metal is deposited on the entire surface of the substrate 122 over the color filter 180 to form a common electrode 162. The transparent conductive metal may be one of indium-tin-oxide (ITO), indium-zinc-oxide (IZO) and indium-tin-zinc-oxide (ITZO).

Although not shown, an overcoat layer for planarization may be further formed on the color filter substrate 122. After forming the array substrate 121 (shown in FIG. 6), the color filter substrate 122 is attached to the array substrate 121 with a liquid crystal layer therebetween. The substrates may be attached by a seal pattern, which may be formed in a non-display region outside of the pixel region.

In the reflective region RA, external light penetrating a liquid crystal layer is reflected by the reflective electrode 149 to again penetrate the liquid crystal layer. Accordingly, the light path in the reflective region RA becomes substantially equal to that of light penetrating the liquid crystal layer via the transmissive region PA after being received from the backlight. Consequently, the first cell gap d1 of the transmissive region TA may be about two times as large as the second cell gap d2 of the reflective region RA. This cell gap difference enhances light efficiency in the reflective and transmissive regions RA and TA.

The reflective electrode, the through-hole for the dual cell gap, and the uneven structure are formed on the color filter substrate, and the color filter substrate and the array substrate are used as the lower substrate and the upper substrate, respectively. Accordingly, the failure in the array substrate can be reduced and the manufacturing yield can be enhanced.

Also, the manufacturing process of the array substrate for the transflective LCD can be simplified using a general array substrate of a transmissive LCD. Consequently, since the process and line for manufacturing the array substrate of the transflective substrate becomes unnecessary, the manufacturing process and cost can be reduced.

Accordingly, in the transflective LCD device according to an embodiment of the present invention, the reflective electrode is not formed on the array substrate. In particular, the array substrate is substantially the same as an array substrate of a transmissive LCD device, thereby simplifying the manufacturing process of the array substrate. Consequently, separate processes and production lines for manufacturing an array substrate of a transflective LCD device become unnecessary, to thereby reduce manufacturing cost and improve production efficiency.

Figure 8:
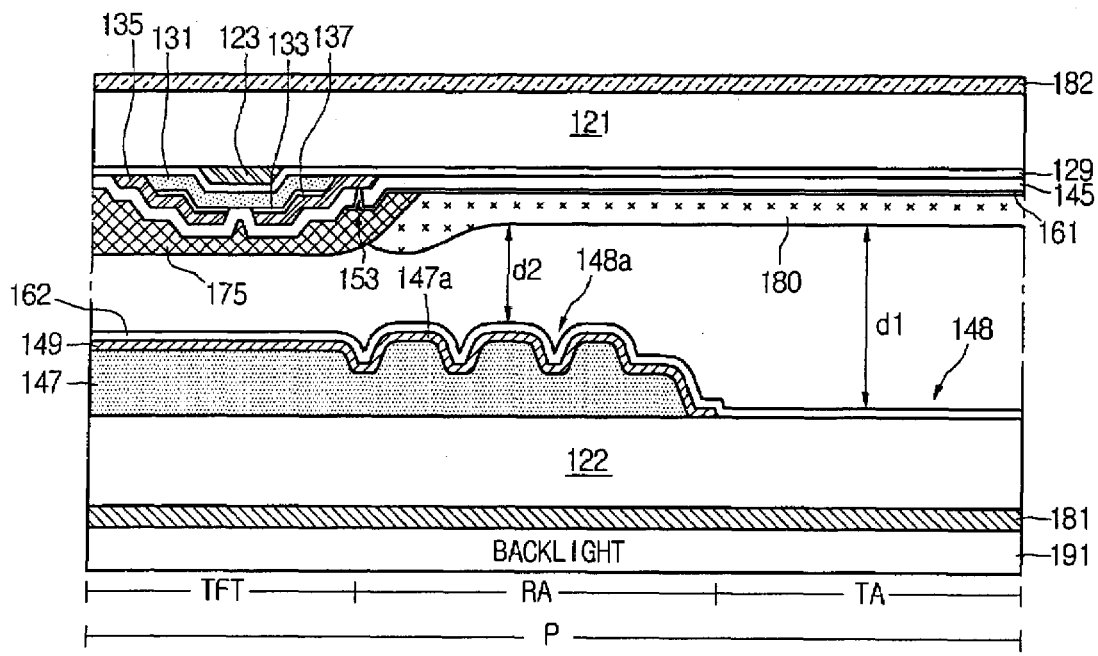
FIG. 8 is a cross-sectional view of a transflective type LCD device according to another embodiment of the present invention.

FIG. 8 is a cross-sectional view of a transflective type LCD device according to another embodiment of the present invention. In FIG. 8, an LCD device includes a first substrate 121, a second filter substrate 122 and a backlight 191. The first substrate 121 and the second substrate 122 are attached to one another with a space therebetween, and a first polarizer 181 and a second polarizer 182 are respectively on upper and lower outer surfaces of the bonded substrates 121 and 122. Light generated by the backlight 191 is incident through the first polarizer 181 onto the second substrate 122.

The first substrate 121 includes switching elements, e.g., thin film transistors ("TFTs"), arranged in a matrix type and at intersections between a plurality of gate lines and a plurality of data lines. Each of the switching elements TFT includes a gate electrode 123, a source electrode 135, a drain electrode 137, an active layer 131 and an ohmic contact layer 133. A gate insulating layer 129 is formed on the entire surface of the first substrate 121 over the gate lines and the gate electrode 123. In particular, the active layer 131 and an ohmic contact layer 133 are formed on the gate insulating layer 129 above the gate electrode 123. The source and drain electrodes 135 and 137 are spaced apart from each other by a distance and contact the ohmic contact layer 133. Although not shown, the source electrode 135 is connected to a data line.

In addition, the first substrate 121 has a pixel region P is defined by the gate and data lines intersecting each other. The pixel region P includes a transmissive region TA and a reflective region RA. Further, a passivation layer 145 is formed on the first substrate 121 over the switching elements, data lines and gate lines. The passivation layer 145 may include a silicon insulation material, such as one of silicon nitride (SiN.sub.x) and silicon oxide (SiO.sub.2).

A pixel electrode 161 also is formed on the passivation layer 145 in the pixel region P. The pixel electrode 161 includes a transparent conductive material, such as one of indium-tin-oxide (ITO), indium-zinc-oxide (IZO) and indium-tin-zinc-oxide (ITZO). The pixel electrode 161 is connected through a drain contact hole 153 to the drain electrode 137.

Moreover, a black matrix 175 is formed on the passivation layer 145 in a region corresponding to the switching element TFT on the first substrate 121 and in a region corresponding to the boundary of the pixel region P. A color filter 180 is further formed in the reflective region RA and the transmissive region TA on the first substrate 121. Thus, the first substrate 121 may be referred to as a Color filter-on-TFT (COT) substrate. Although not shown, the switching element TFT may be formed above the black matrix 175 and the color filter 180 on the first substrate 121, which may be referred to as a TFT-on-Color filter (TOC) substrate.

The second substrate 122 includes a reflective electrode 149 and an insulating layer 147. The insulating layer 147 has a through-hole 148 and an uneven pattern 147a for providing a varying cell gap. The reflective electrode 149 is formed in the reflective region RA above the insulating layer 147 and may include a highly reflective metal, such as one of aluminum (Al) and an Al alloy.

Accordingly, the bonded substrates 121 and 122 have a first cell gap d1, which is greater than a second cell gap d2. The first cell gap d1 is in the transmissive region TA corresponding to the through-hole 148, and the second cell gap d2 is in the reflective region RA corresponding to the uneven pattern 147a. For example, the first cell gap d1 in the transmissive region TA may be about two times as large as that the second cell gap d2 in the reflective region RA. In particular, in the reflective region RA, the bonded substrates 121 and 122 may have a varying cell gap corresponding to the shape of the uneven pattern 147a. In particular, the substrates 121 and 122 may have a step-wise or a varying cell gap in a transitional region between the reflective and transmissive regions RA and TA. As a result, light efficiency is improved in the reflective and transmissive regions RA and TA. Further, the LCD device may have one of twisted nematic (TN), optically compensated bend (OCB), electrically controlled birefigence (ECB), vertical alignment (VA), and fringe field switching (FFS) modes.

Figure 9:
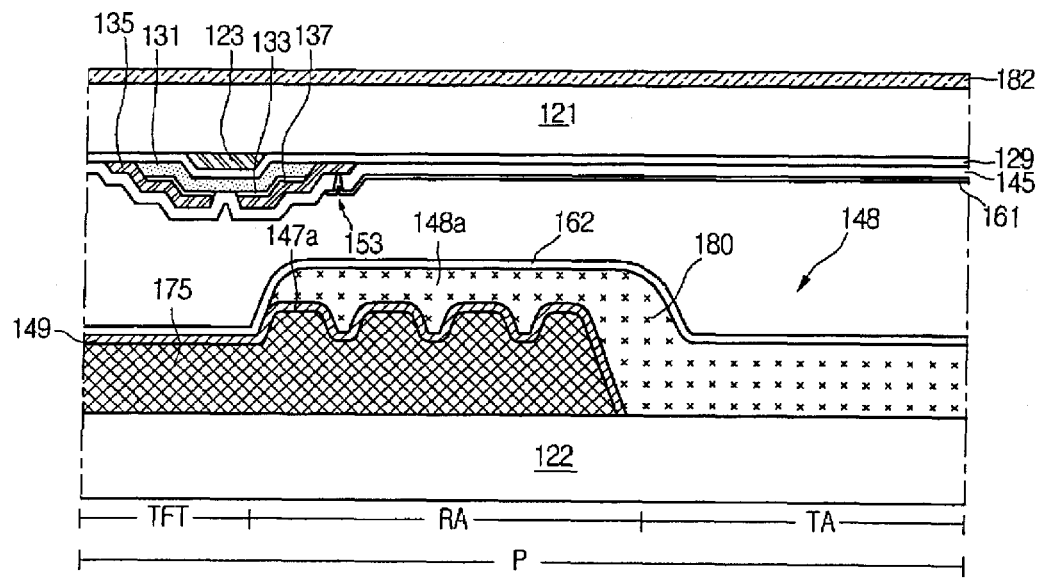
FIG. 9 is a cross-sectional view of a transflective type LCD device according to yet another embodiment of the present invention.

FIG. 9 is a cross-sectional view of a transflective type LCD device according to yet another embodiment of the present invention. In FIG. 9, an LCD device includes an array substrate 121, a second substrate 122 and a backlight 191. In particular, the array substrate 121 of the transflective LCD device is substantially identical to an array substrate of a transmissive LCD device. Therefore, the array substrate 121 may be used for either a transflective LCD device or a transmissive LCD device, thereby increasing production yield.

In addition, the second substrate 122 includes a reflective electrode 149 formed on a black matrix 175. The black matrix 175 may have a through-hole 148 for a dual cell gap structure and an uneven pattern 147a for further enhancing the reflection efficiency. The reflective electrode 149 is formed in the reflective region RA above the black matrix 175 and may include a highly reflective metal, such as one of aluminum (Al) and an Al alloy. A color filter 180 is further formed in the reflective region RA and the transmissive region TA.

Moreover, the transflective LCD device has a dual cell gap in the refractive and transmissive regions RA and TA due to the through-hole 148. For example, the first cell gap d1 in the transmissive region TA may be about two times as large as that the second cell gap d2 in the reflective region RA. In particular, the substrates 121 and 122 may have a step-wise or a varying cell gap in a transitional region between the reflective and transmissive regions RA and TA. As a result, light efficiency is improved in the reflective and transmissive regions RA and TA. Further, the LCD device may have one of twisted nematic (TN), optically compensated bend (OCB), electrically controlled birefigence (ECB), vertical alignment (VA), and fringe field switching (FFS) modes.

Accordingly, in the transflective LCD device according to an embodiment of the present invention, the reflective electrode is not formed on the array substrate, and an uneven pattern for providing dual cell gap is not formed in a separate insulating layer. In particular, the array substrate is substantially the same as an array substrate of a transmissive LCD device and the uneven pattern is formed in a black matrix, thereby simplifying the manufacturing process of the array substrate. Consequently, separate processes and production lines for manufacturing an array substrate of a transflective LCD device become unnecessary, to thereby reduce manufacturing cost and improve production efficiency.

It will be apparent to those skilled in the art that various modifications and variations can be made in the transflective liquid crystal display device and the manufacturing method thereof of the present invention without departing from the spirit or scope of the invention. Thus, it is intended that the present invention covers the modifications and variations of this invention provided they come within the scope of the appended claims and their equivalents.

What is claimed is:

1. A method of manufacturing a liquid crystal display device, comprising:
    forming a gate electrode and a gate line on a first substrate, the gate line being electrically connected to the gate electrode;
    forming a first insulating layer on the first substrate;
    forming an active layer and an ohmic contact layer above the gate electrode, source and drain electrodes contacting the ohmic contact layer, and a data line electrically connected to the source electrode, the data line intersecting the gate line to define a pixel region;
    forming a pixel electrode contacting the drain electrode in the pixel region;
    depositing an organic insulating layer on a second substrate;
    patterning the organic insulating layer to form a through-hole and a groove;
    forming a reflective electrode on the organic insulating layer over the groove;
    forming a color filter layer in the through-hole on the second substrate and over the groove of the reflective electrode;
    forming a black matrix on the second substrate; and
    forming a liquid crystal layer between the first substrate and the second substrate,
    wherein the black matrix is formed on the reflective electrode corresponding to the source and the drain electrodes of the first substrate.

2. The method according to claim 1, wherein the patterning the organic insulating layer includes exposing the organic insulating layer to light through a halftone mask or a diffractive mask.

3. The method according to claim 1, further comprising forming a common electrode on the color filter layer.

4. A method of manufacturing a liquid crystal display device, comprising:
    forming at least one switching element and a pixel electrode on a first substrate;
    forming a reflector on a first surface of a second substrate;
    forming a liquid crystal layer between the first and second substrates; and
    arranging a light source for light to be incident onto a second surface of the second substrate;
    forming a black matrix and a color filter layer on one of the first and second substrates;
    forming an insulating layer on the first surface of the second substrate and below the reflector,
    wherein the forming the insulating layer includes,
    depositing a light blocking material on the second substrate; and
    patterning the light blocking material,
    wherein the black matrix is formed on the reflector corresponding to the switching element of the first substrate, and
    wherein the color filter layer is formed on the reflector and the second surface of the second substrate.

5. The method according to claim 4, wherein the forming the reflector includes forming the reflector to have an uneven pattern.

6. The method according to claim 4, wherein the forming the insulating layer includes: forming at least one groove in the insulating layer.

7. The method according to claim 4, wherein the forming the insulating layer includes: depositing one of an organic insulating material and an inorganic insulating material on the second substrate; and patterning the deposited insulating material.

8. The method according to claim 4, wherein the forming the insulating layer includes: depositing a light blocking material on the second substrate; and patterning the light blocking material.

* * * * *